Figure 1:
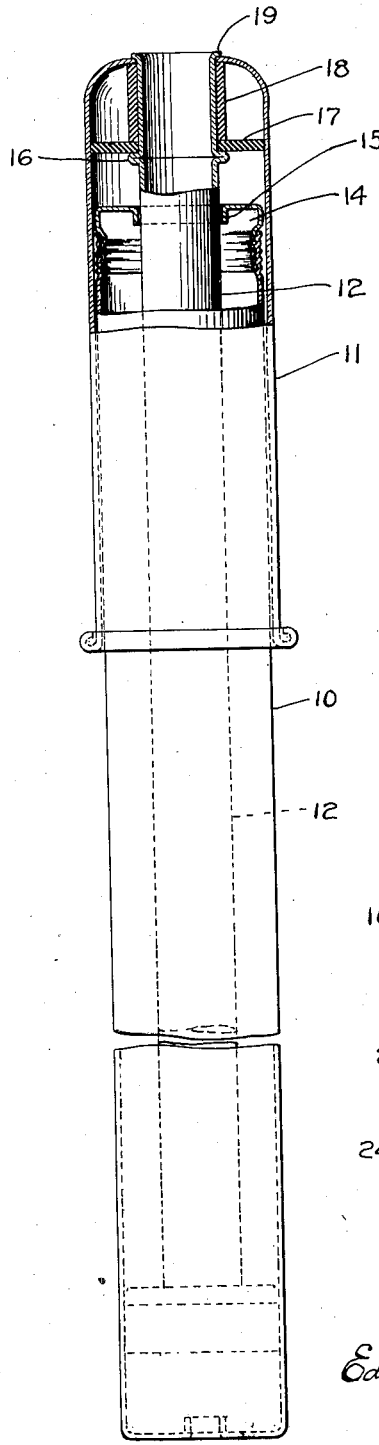

E. N. GARRISON.
BICYCLE PUMP.
APPLICATION FILED APR. 26, 1912.

1,058,961.

Patented Apr. 15, 1913.

WITNESSES:
H. W. Meade
S. W. Atherton

INVENTOR
Edward N. Garrison
BY
A. M. Wooster
ATTORNEY

UNITED STATES PATENT OFFICE.

EDWARD N. GARRISON, OF BRIDGEPORT, CONNECTICUT, ASSIGNOR TO THE COE-STAPLEY MANUFACTURING COMPANY, OF BRIDGEPORT, CONNECTICUT, A CORPORATION OF CONNECTICUT.

BICYCLE-PUMP.

1,058,961.

Specification of Letters Patent.

Patented Apr. 15, 1913.

Application filed April 26, 1912. Serial No. 693,492.

*To all whom it may concern:*

Be it known that I, EDWARD N. GARRISON, a citizen of the United States, residing at Bridgeport, county of Fairfield, State of Connecticut, have invented an Improvement in Bicycle-Pumps, of which the following is a specification.

This invention has for its object to provide a simple and inexpensive bicycle pump so constructed as to do away with the use of solder in securing the parts together. This I accomplish by a novel construction and arrangement of the parts which are secured together by mechanical operations only, thereby providing a very strong and serviceable pump and at a greatly reduced cost of construction.

With these and other objects in view, I have devised the novel bicycle pump which I will now describe, referring to the accompanying drawing forming a part of this specification and using reference characters to indicate the several parts.

Figure 2:
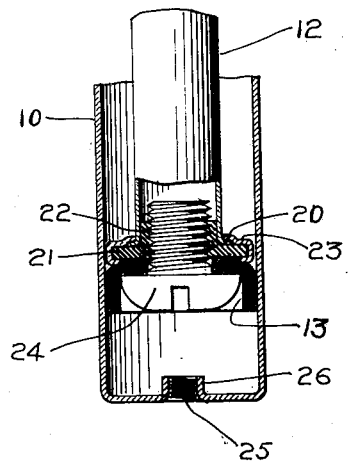

Figure 1 is an elevation of my novel pump, partly broken away to show the construction of the upper end thereof; and Fig. 2 is a view showing the construction of the lower end thereof.

10 denotes the cylinder, 11 the handle which is adapted to slide over the upper end of the cylinder in its forward position, 12 a tubular piston rod and 13 the piston. The upper end of the cylinder is provided with a rolled thread and is closed by a cap 14 having a corresponding thread which engages the thread on the cylinder internally. The cap is provided with a central hole, the surrounding metal being turned inward to form a flange 15 which furnishes a firm support for the piston rod. In order to provide a firm and rigid means of attaching the handle to the piston rod, I upset the tubular piston rod endwise to form, or otherwise form upon said rod, an external rib or shoulder 16. This rib supports a washer 17, which is provided with a central hole through which the piston rod passes. Above the washer and surrounding the piston rod is a spacing sleeve 18. The upper end of the handle is closed inward over the top of the sleeve and into engagement with the piston rod, which passes through the end of the handle and is closed over outward upon the top of the handle, as at 19. I thereby effectually brace and strengthen the handle and provide a rigid attachment of the handle to the tubular piston rod. The lower end of the tubular piston rod is flanged outward as at 20.

21 denotes a washer having an inwardly extending threaded flange 22 which lies within the piston rod. This washer lies intermediate the piston and the flanged end of the piston rod and in contact with both. The washer is rigidly secured to the flanged end of the piston rod by means of a locking washer 23 which is closed under washer 21 and over the flange on the piston rod. The piston, which is an ordinary bucket piston, is secured to the piston rod by means of a screw 24 which passes through the piston and engages the threaded flange of the washer.

The operation is as usual in pumps of this type. On the upstroke, air enters the cylinder freely and passes the piston. On the down-stroke the piston expands and expels the air from the cylinder through opening 25 at the bottom of the cylinder, which is shown as provided with a threaded inturned flange 26 for the attachment of a tube or suitable air connection.

Having thus described my invention, I claim:

1. In a pump, the combination with a handle and a tubular piston rod having an external rib, of a washer resting on said rib and a collar resting on the washer, said parts being secured together by closing the top of the handle inward over the collar and against the tubular piston rod and closing the upper end of the piston rod over outward upon the top of the handle.

2. In a pump, the combination with a cylinder threaded at its upper end, a cap engaging said cylinder and provided with a central hole, of a handle, a tubular piston rod passing through the hole in the cap and provided with an external rib, a washer resting on said rib and a spacing sleeve resting upon the washer, the handle being secured to the piston rod by closing the upper end of the handle inward over the sleeve and against the piston rod and closing the upper end of the piston rod over outward upon the top of the handle.

3. In a pump, the combination with a piston rod having an outwardly extended flange at its lower end, and an operating handle at its upper end, of a washer bearing against said flange and having an internally threaded boss extending into said piston rod, a locking washer uniting said first mentioned washer to said flange, a piston, and a screw passing through said piston and engaging said threaded boss.

4. In a pump, the combination with a piston rod and an operating handle secured to the upper end thereof, of a washer having an internally threaded boss extending into the other end of said piston rod, means for securing said washer to said piston rod, a piston, and a screw passing through said piston and engaging said threaded boss.

In testimony whereof I affix my signature in presence of two witnesses.

EDWARD N. GARRISON.

Witnesses:
S. W. ATHERTON,
M. L. HAGGEMAN.